May 15, 1951 — R. L. FALGE — 2,553,307
PLURAL SOCKET FLASHLIGHT HAVING FLEXIBLE
SWITCH-OPERATING CONTAINER
Filed Aug. 21, 1945 — 2 Sheets—Sheet 1
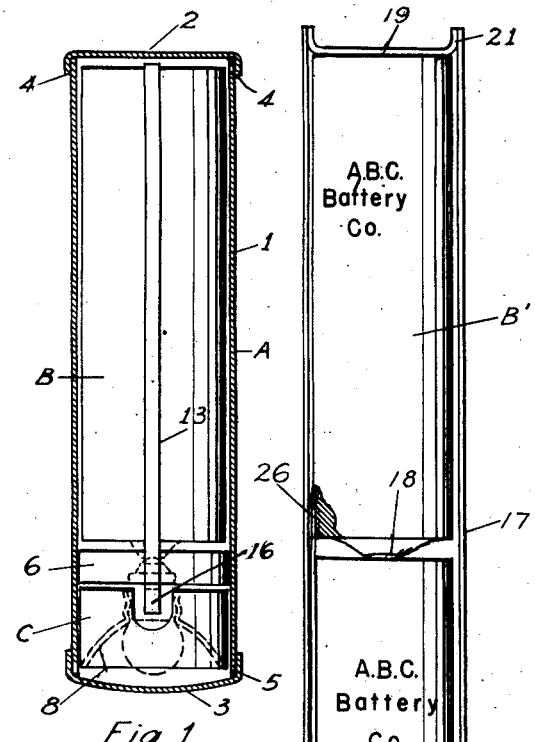
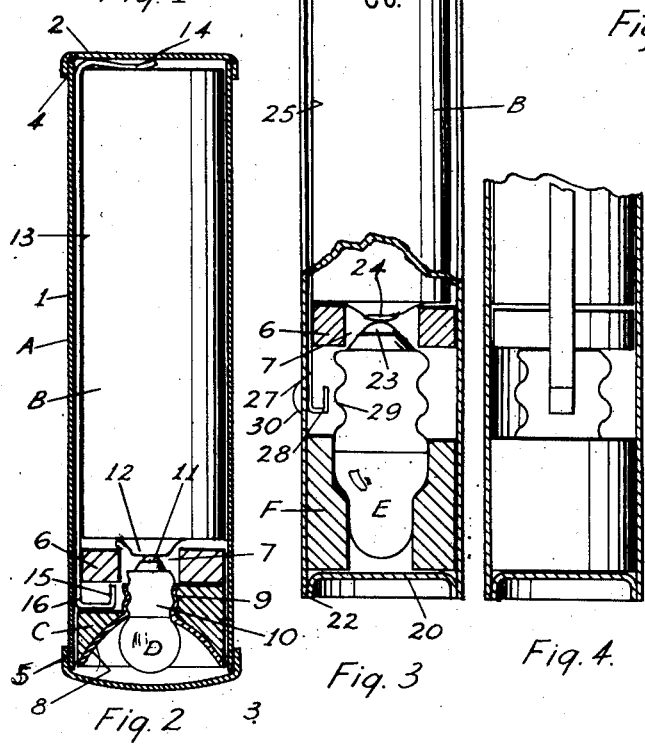
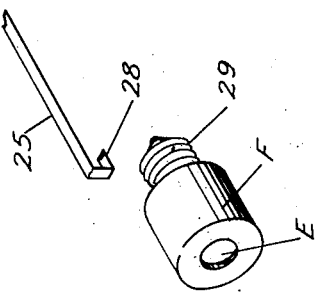
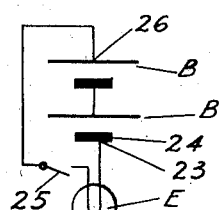
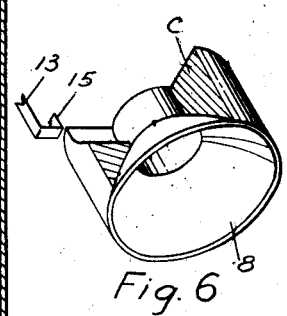
R. L. FALGE
*INVENTOR.*
BY *Patterson, Wright & Patterson*
ATTORNEYS

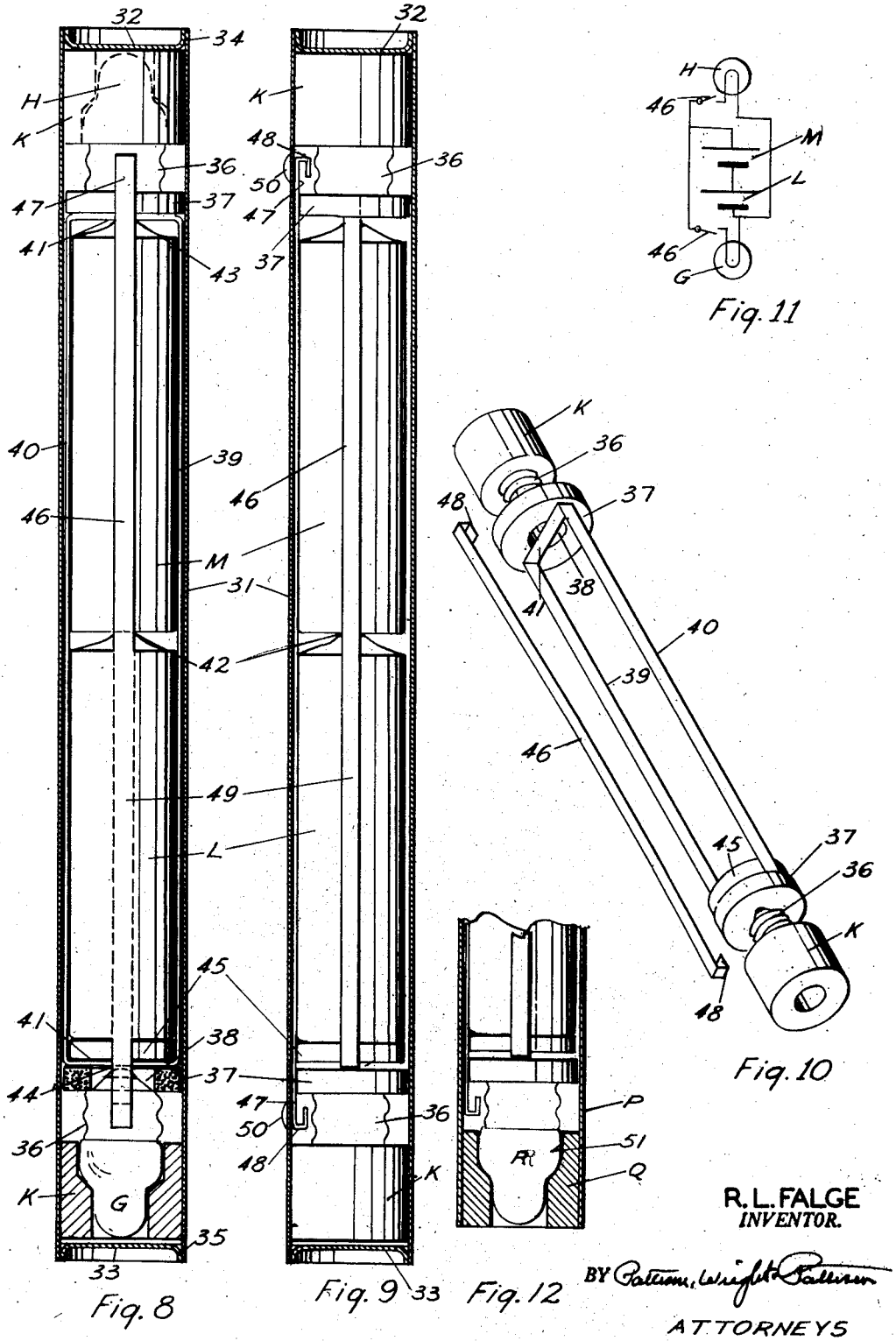

Patented May 15, 1951

2,553,307

UNITED STATES PATENT OFFICE 2,553,307

PLURAL SOCKET FLASHLIGHT HAVING FLEXIBLE SWITCH-OPERATING CONTAINER

Raymond L. Falge, Bethesda, Md.

Application August 21, 1945, Serial No. 611,809

1 Claim. (Cl. 240—10.68)

This invention pertains to illuminating devices and more particularly and specifically to an electric flash, signal or torch light.

The primary object of the invention is the provision of such a device which is completely air and water tight.

The device can quite properly be said to be hermetically sealed for the reason that in the form of the invention as illustrated in the drawings the carrier or casing of the device has its several parts joined by fusion or the equivalent thereof. However, a fusion sealing of the container or carrier is not absolutely essential as the carrier could be otherwise made air and water tight. Accordingly when the device is hereinafter referred to as being "hermetically" sealed it is intended that this term be interpreted as meaning water and air tight irrespective of whether any parts thereof are joined together by fusion.

For brevity the device will be hereinafter referred to as a "flash light" but such term shall be interpreted to include all forms of electrical illuminating devices of that general nature such as torches and signal lights. Generally a flash light is a portable device and the drawings and description illustrate and describe a portable device, but the inventive concept is not limited to a portable flash light as the basic principle of the invention can be incorporated into illuminating devices which are too heavy or large to be classified as portable.

A completely air and water proof flash light has many advantages which will be immediately obvious to those skilled in and familiar with this art and all of these therefore need not be specifically recited. Among the advantages are the following. As long as the flash light batteries have sufficient current to illuminate the battery light definite positive operation of the light is assured under any and all conditions which is of course highly desirable and is a real necessity in respect to flash lights used by the armed forces who subject flash lights to all possible imaginable climatic conditions. In a water and air proof light the life of the batteries and therefore the life of the flash light is multiplied many times. Assured operation and greater length of life of the flash light is obtained also by reason of the fact that the light bulbs are protected to the ultimate against possible breakage. A water and air proof flash light provides an illuminating medium which can be actually used under water which not only widens its field of use but also assures that the operation of the light will not be destroyed through accidental immersion of the light in water or some other liquid.

Flash lights as they are commonly known, made and used, comprise a dry battery or batteries commonly referred to as cells, a light source commonly referred to as a light bulb, a switch for controlling the flow of current to the light bulb, and a casing.

In the present invention the battery, the bulb and the switch are completely housed within the casing, hereinafter sometimes referred to as the carrier, and the casing constitutes a totally air and water proof carrier and protector for these parts.

Accordingly, another object of the invention is the provision of a flash light which is in its entirety enclosed within an imperforate carrier casing wherein the structure is such that operation of the switch to control the lighting of the flash light bulb is conveniently and efficiently obtained without in any way destroying the air and water tight seal of the carrier.

The broad inventive concepts of the invention can be embodied in flash lights having various specific constructions several of which are illustrated in the drawings, but it is to be understood that the drawings do not attempt to illustrate all possible embodiments of the invention and that the invention is therefore to be limited only within the scope of the hereinafter following and appended claim.

It is highly desirable that a flash light be such that it can be cheaply manufactured and the present light has this advantage to the utmost degree. The present light can be produced and sold at a price sufficiently small to permit it to be thrown away when the electric battery becomes dead. In fact it is intended that the flash light be discarded in its entirety when it will no longer function by reason of lack of current in the battery. This provides an improved and highly desirable flash light.

Other advantages and improvements of the present invention will appear in part from the following description, or will be recognized by those skilled in the art or can be ascertained through the practice and use of the invention.

Referring now to the drawings in which are illustrated several, but not all, forms in which the inventive concept may be embodied:

Fig. 1 is a side elevational view of a flash light.

Fig. 2 is a horizontal sectional view of the flash light of Fig. 1.

Fig. 3 is a side elevational view, partly in horizontal section, of a modified form of flash light.

Fig. 4 is a fragmentary view showing one end of the flash light of Fig. 3.

Fig. 5 illustrates the electrical circuit of the flash light of Fig. 3.

Fig. 6 is a detailed perspective view, partly in section, of the bulb end of the flash light of Fig. 2.

Fig. 7 is a detailed perspective view of the bulb and socket and one end of the switch of the flash light of Fig. 3.

Fig. 8 is a horizontal sectional view of a further modified form of flash light.

Fig. 9 is a view in side elevation of the flash light of Fig. 8.

Fig. 10 is a perspective view of a portion of the construction comprising the flash light of Fig. 8.

Fig. 11 illustrates the electrical circuit of the flash light of Fig. 8.

Fig. 12 illustrates a further modification of the invention.

Describing the constructions illustrated in the drawings and utilizing like reference characters and numerals throughout the description to indicate similar parts, and referring first to Figs. 1 and 2, A represents a container or carrier made up of a open-ended tubular member 1 having one end closed by a bottom cap 2 and its opposite end closed by a top cap 3. These caps telescopically receive the respective ends of the tube 1 and have a water and air tight sealing connection therewith at the points 4 and 5.

The carrier tube 1 is of the proper size and configuration to snugly receive an electric battery or cell B. The length of the tube is greater than that of the battery so that immediately above the battery there is space to receive a disc 6 composed of some non-current-conducting material. This disc is provided with a central opening 7. Immediately beneath the top cap 3 and within the carrier there is positioned a socket C having a concave face for the reception of a reflector 8 having an extending threaded end 9 to threadedly receive the exterior threaded body portion 10 of an electric bulb D the lower end of which extends through the opening 7 of the disc 6 so that its conventional metallic contact 11 engages the positive terminal 12 of the battery.

The socket C is preferably suitably adhesively connected to the interior of the tube carrier 1 against displacement, and this connection can and preferably should be water and air tight in nature.

The switch for controlling the flow of current to the light bulb is in the form of an elongated metallic bar 13 having one of its ends 14 bent at right angles and disposed behind or beneath and in engagement with the lower end of the battery B and constitutes an electrical connection with the negative side of the battery. This bar extends along the entire length of the battery and has its opposite end bent inwardly as indicated at 15. This end of the switch is closely adjacent but is held in spaced relationship with the threaded portion 9 of the bulb socket by the disc 6. The switch is composed of some suitable resilient current conducting material and this resiliency causes the end 14 of the switch bar to exert a pressure upon the battery to hold the positive terminal 12 of the battery at all times in engagement with the contact 11 at the lower end of the bulb.

The cap 3 at the upper or front end of the carrier is composed of a transparent material so as to permit the free and undistorted passage of light from the bulb D.

The construction thus far described provides a complete operative flash light housed within an air and water tight carrier. Operation of the electric current control switch may be provided for in either of two ways. The carrier tube 1 can be composed in its entirety of pliable material with the result that pressure upon the exterior of the tube immediately above or behind the portion 16 of the switch bar will cause the end 15 of the switch to electrically engage the threaded portion 9 of the bulb socket and thus close the electric circuit and cause the illumination of the bulb. As long as this pressure is maintained the circuit will remain closed. Upon removal of the pressure the inherent resiliency of the switch bar will cause it to return to the position illustrated in Fig. 2 of the drawings thus breaking the circuit. This pressure can be readily and conveniently exerted by the thumb or finger of the flash light operator.

The optional manner of providing for operation of the switch is that of making the carrier tube 1 pliable in that portion lying immediately behind or above the portion 15 of the switch.

Obviously optional constructions can be provided. The entire carrier comprising the tubular portion and the caps can be made of pliable material. It is however only essential that the carrier be pliable in that area where pressure is exerted upon the switch to bring about the closing of the electric circuit. It would however probably be desirable to make the cap 3 of a material which is non-breakable, that is shatterproof, rather than of glass or any similar material which is easily breakable. The casing or carrier can be composed of many different kinds of materials and yet provide the pliability necessary to the operation of the switch and the transparency necessary for the passage of the light from the bulb. As an instance, it can be composed of acetate in sheet form. The use of such a material simplifies the fusion or connection of the end caps and the sealing of the meeting and overlapping edges of the sheet which is given a tubular form to provide the tube 1. Acetate permits of air and water tight fusion or connection by the use of a suitable solvent. It is to be understood however that the parts making up the carrier casing could be molded. The development of plastics is now becoming so rapid that the carrier could be made of many different materials and in many different ways and still provide for the flexibility and transparency necessary to the provision of an operative air and water tight flash light.

As a matter of fact it might be found desirable to make the bulb socket C of acetate so as to simplify fusion or connection between the socket and the carrier tube 1.

The modified form of flash light appearing in Figs. 3 and 4 of the drawings differs little from that previously described. These differences will now be described. The carrier or container tube 17 is sufficiently elongated to receive two batteries B and B', which are electrically connected in a conventional manner by having the positive terminal 18 of the lower battery in electrical engagement with the bottom of the upper battery B. The bottom cap 19 of the container and the top cap 20 are telescopically received by the tube and have a water and air tight connection with the tube at the points 21 and 22. The top cap 20 is composed of a transparent material. Within the carrier tube there is the same disc 6 with its opening 7 for the passage of the lower end of the light bulb E so that the electrical contact 23 of the bulb engages the positive terminal 24 of the upper battery B. The bulb is carried by a socket F. In this instance there is no light reflector provided as the bulb of that type, now well known, wherein the reflector is either incorporated in the bulb or the bulb is such as to need no reflector to project the light which it generates.

In this instance the light switch comprises an elongated flexible current conducting bar 25 having its lower end electrically conected to the negative side of the lower battery B' as at 26 and has an end 27 projecting beyond the disc 6 with a down or inturned portion 28 positioned closely adjacent but in spaced relationship to the metallic or current conducting portion 29 of the light bulb. Batteries are customarily provided with a paper or other like wrapping and consequently the switch bar 25 does not make electrical contact with the upper battery B notwithstanding the fact that the bar rests upon the outer side of the battery.

The tube 17 immediately above the extending end 27 of the switch bar is provided with a button-like projection 30.

In operation this flash light is identical to that previously described, the circuit being closed by exerting pressure upon the button 30 so as to press the end 28 of the switch bar into electrical engagement with the metallic portion 29 of the bulb.

The Fig. 3 form of the invention embodies a further modification in that the carrier tube 17 is composed of transparent material either in its entirety or, optionally, in part. This has decided advantages. One of these is that the name of the battery manufacturer, which customarily appears on the battery wrapping, is visible. This the battery manufacturers would highly approve of because of the obvious advertising advantages. The transparency of the carrier opens a wide field of development. Advertising of whatever desired nature could be placed upon the batteries which could lead to the use of the flash light as a souvenir gift for advertising and goodwill purposes. The flash light could also be used in the educational field by placing the desired printing or indicia upon the batteries. Hereinafter a flash light suitable for signal purposes by the armed forces is illustrated and described. The use of a transparent carrier on such a light would make it possible to place on the batteries and within the carrier the Morse code or any other information which would be helpful to the user. It is of course impossible to enumerate all of the possible advantages and uses opened up by the provision of a transparent carrier.

A further modified form of the invention appears in Figs. 8 to 10 inclusive wherein is illustrated a double flash light which is designed for signal purposes and therefore might more accurately be called a signal light. Structurally this particular light differs from those previously described but it embodies the same basic principles which comprise the present broad inventive concept.

Describing this modified form of the invention in detail the casing constituting the carrier is constructed substantially identical to the carrier of the light of Fig. 3 in that it is composed of an elongated tubular portion 31 the open ends of which telescopically receive a lower cap 32 and an upper transparent cap 33 which have water tight connection as at 34 and 35 with the tube to provide an air and water tight hermetically sealed container.

In this instance two flash light bulbs G and H are provided at opposite ends of the carrier and accordingly the bottom cap 32 must be made of a transparent material. In each instance the bulbs are carried by a socket K and have their lower ends extending inwardly beyond the inner ends of the socket and are provided with a threaded metallic sheath 36. A non-current-conducting washer or disc 37, similar in nature to the previously described disc 6, is associated with each of the light bulbs and each of these discs is provided with a central opening 38 for the passage of the lower end of the bulb body portion. These discs are connected by a rectangular frame-like member comprising parallel side legs 39 and 40 the ends of which are joined by cross legs 41 which are suitably secured to the inner faces of the discs 37.

The current supply for the light bulbs is in the form of two batteries L and M arranged in end to end relationship and electrically connected by reason of the engagement of the positive pole 42 of the battery L with the bottom of the battery M. The positive pole 43 of the battery M is in electrical engagement with the cross leg 41 of the metallic frame. Both cross legs 41 extend across the openings 38 in the washers 37 with the result that the electrical contacts 44 of the light bulbs make electrical contact with the cross legs with the result that the bulbs are electrically connected at all times with the positive pole of the batteries. The frame does not electrically connect with the negative poles of the batteries because of the paper or other insulating wrapper which is conventional with dry cells, and for the further reason that the cross leg 41 of the frame is held in spaced relationship from the bottom and negative pole of the battery L by a suitable insulator 45.

The switch is of the same form previously described and comprises a bar of resilient current conducting material having a main elongated straight portion 46 having ends 47 extending over and beyond the discs 37 and terminating in inwardly or downwardly bent portions 48 normally positioned closely adjacent but in spaced relationship to the metallic sheathings 36 of the light bulbs. The straight portion 46 of the switch does not pass over the insulating wrapper of the battery L but under said wrapping, as illustrated at 49, with the result that the bar electrically engages the casing of the battery or cell L thus making electrical connection with the negative pole or side of this battery.

Immediately above the extending end portions 47 of the switch bar the carrier tube 31 is provided with a button 50.

Like the previously described forms of the invention the carrier tube is either in its entirety or immediately above the extending ends 47 of the switch bar composed of a flexible or pliable material, with the result that pressure upon either of the buttons 50 will result in depressing the switch bar so that its respective bent end 48 will electrically engage the respective metallic sheathing 36 to close the electric circuit to the selected light bulb so as to cause its illumination. Upon removal of pressure upon the button the inherent resiliency of the switch bar will return the parts to the position illustrated in Fig. 9 and open the electric circuit with the consequent extinguishment of the light bulb.

As this particular form of the invention is designed to serve as a signal light the bulbs G and H would be of different colors or one of them would be white and the other of a selected color. Obviously, should it be desired both lights can be caused to be simultaneously illuminated. That this is so will be apparent from the preceding description and from reference to the wiring circuit of the flash light as shown in Fig. 11 of the drawings.

The construction appearing in Fig. 12 differs from the previously described structures in one respect only and the arrangement here illustrated can be used in any of the previously described forms of the invention. The difference resides in the elimination of a closure cap over the light bulb end of the flash light. To permit of this elimination and still provide a water and air tight device the carrier tube P has an air and water tight connection or seal with the plug or light socket Q. Completion of a water tight closure is attained by providing a water tight fit and seal between the light bulb R and the socket or plug Q. The bulb and the plug have a considerable area of contact as at 51 and there would be no difficulty in rendering this water and air tight. This could be accomplished in numerous ways.

From the foregoing description it will be seen that there is provided a hermetically sealed flash or signal light which is highly efficient in operation and in the performance of providing a completely and totally protected flash light which can be produced and sold at a sufficiently low price as to make it possible to throw the complete device away when the battery cells are exhausted. The possible uses and exploitations of such a flash light have been touched upon but go even beyond those specifically mentioned. There are inumerable materials which would be suitable to utilize in the production of the carrier container and this is true also when it is desired that the carrier be completely transparent. The carrier is illustrated as being of a circular shape in transverse cross section but obviously it could be rectangular, hexagonal or of any other shape found to be desirable or advantageous.

The constructions illustrated in the drawings can be interchanged and modified by one another. Two batteries may be used with a single bulb or one battery with two bulbs. A reflector can be provided or not, as desired. The specific manner of providing contact between the switch and the negative pole of the battery can be modified and the exact point of contact of the switch with the light bulb can be varied to suit convenience and desire.

The forms into which the inventive concept may be incorporated are therefore extremely flexible and varied; and the invention is therefore to be limited only within the scope of the hereinafter appended claim as interpreted in the light of prior art and practices.

I claim:

An improved device comprising an imperforate air and water tight container completely enclosing the following defined electric flashlight: a pair of electric batteries arranged in end to end relationship and in electrical connection with one another, a frame holding said batteries in the defined relationship within the container, said frame having at its ends electric bulb carrying sockets which dispose the bulbs with one bulb in electric contact with the positive terminal of the battery circuit at one end of the container and the other bulb at the opposite end of the container, said frame electrically connecting the last named bulb with the positive terminal of the battery circuit, a combined conductor and switch having electric contact with the negative terminal of the battery circuit, said combined conductor and switch comprising an elongated resilient metallic element extending throughout the lengths of the batteries and beyond the battery ends, one end of said element being above and in normally spaced relationship to the carrying socket of one light bulb and the other end of said element being above and in normally spaced relationship to the carrying socket of the other light bulb, and the container having flexible portions permitting the container to be bent inwardly to selectively move the ends of said elongated resilient metallic element into engagement with either or both of said bulb carrying sockets to close the circuit to either or both said light bulbs.

RAYMOND L. FALGE.

REFERENCES CITED

The following references are of record in the file of this patent:

UNITED STATES PATENTS

| Number    | Name          | Date          |
|-----------|---------------|---------------|
| 1,466,350 | Barany        | Aug. 28, 1923 |
| 1,671,744 | Rosenberg     | May 29, 1928  |
| 1,866,600 | Rauch         | July 12, 1932 |
| 1,922,801 | Gillingham    | Aug. 15, 1933 |
| 2,070,755 | Seigle et al. | Feb. 16, 1937 |
| 2,252,950 | Seiss         | Aug. 19, 1941 |
| 2,262,040 | Pell          | Nov. 11, 1941 |
| 2,234,972 | Lennan        | Mar. 18, 1941 |
| 2,387,144 | Gey           | Oct. 16, 1945 |

FOREIGN PATENTS

| Number  | Country       | Date          |
|---------|---------------|---------------|
| 418,471 | Great Britain | Oct. 25, 1941 |